(No Model.) 2 Sheets—Sheet 2.
J. A. GRAHAM.
GRAIN HARVESTER.
No. 428,479. Patented May 20, 1890.
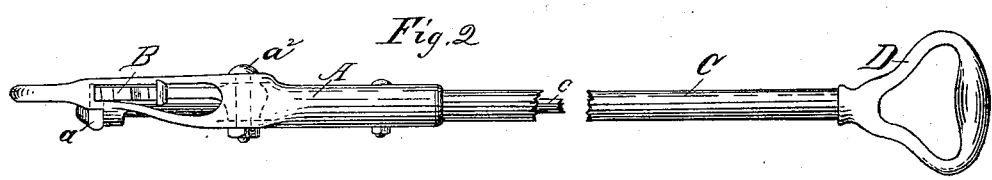
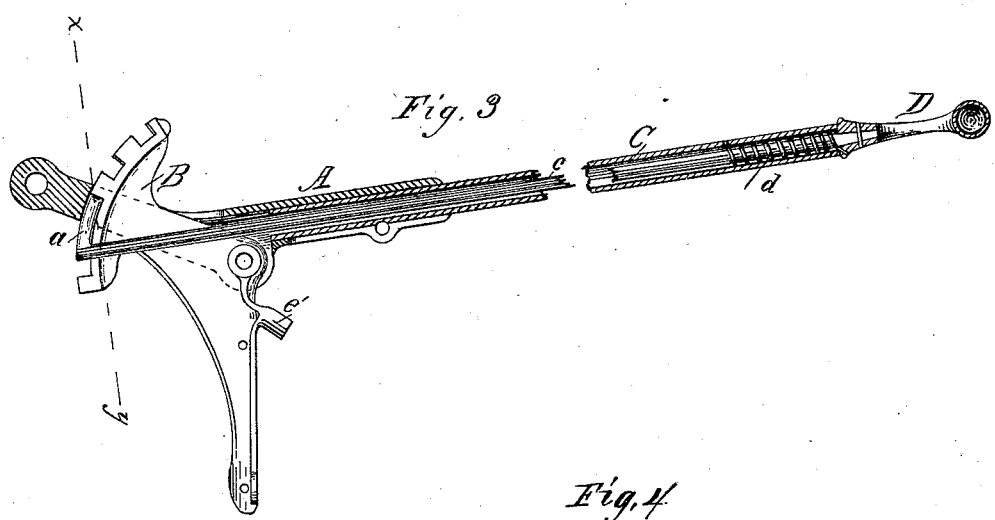
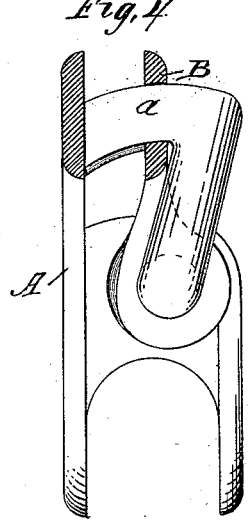
Witnesses
G. H. Schulte
R. C. Livesay
Inventor
James A. Graham

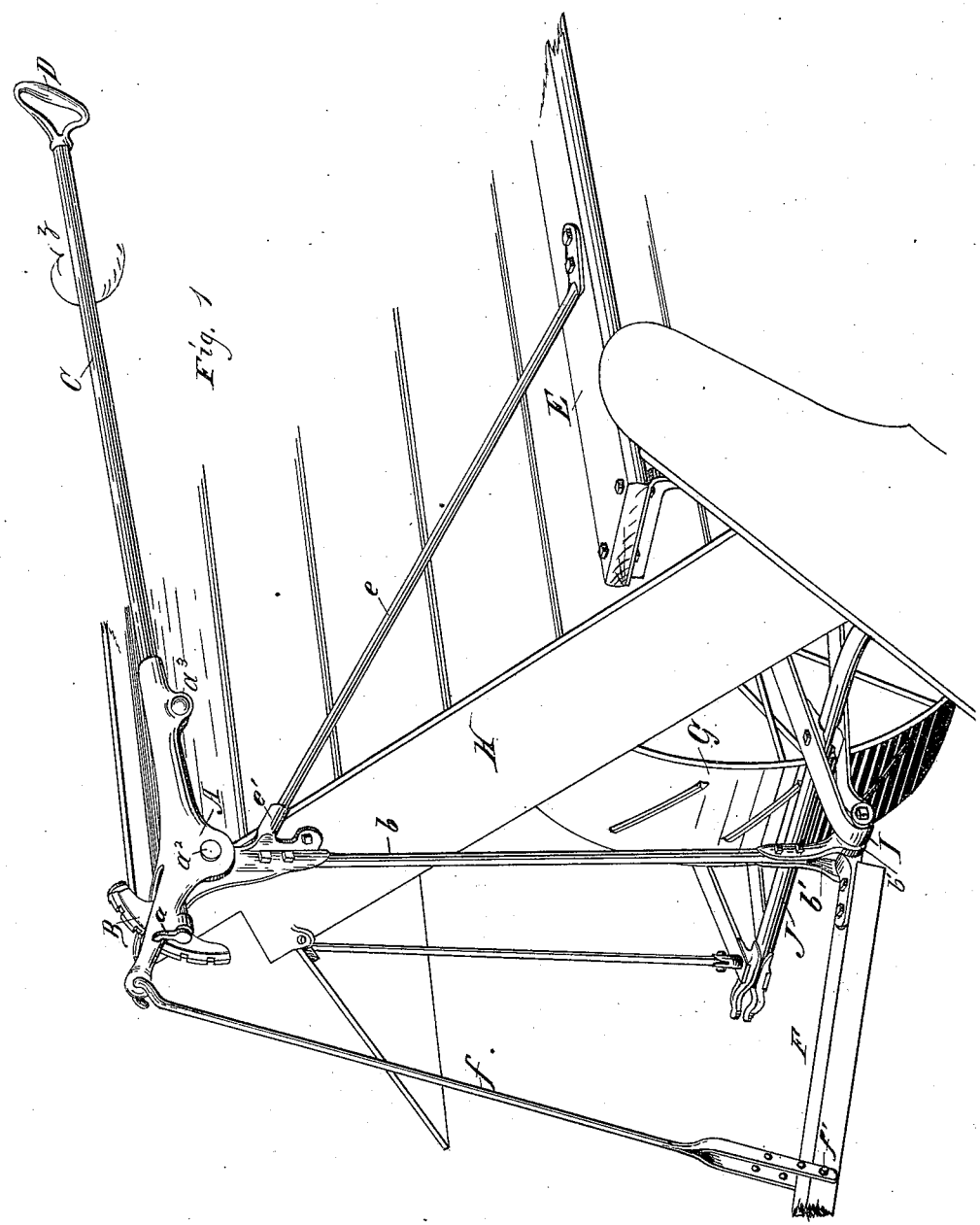

UNITED STATES PATENT OFFICE.

JAMES A. GRAHAM, OF MILWAUKEE, WISCONSIN, ASSIGNOR TO THE MILWAUKEE HARVESTER COMPANY, OF SAME PLACE.

GRAIN-HARVESTER.

SPECIFICATION forming part of Letters Patent No. 428,479, dated May 20, 1890.

Application filed October 29, 1889. Serial No. 328,603. (No model.)

*To all whom it may concern:*

Be it known that I, JAMES A. GRAHAM, a citizen of the United States, residing at Milwaukee, in the county of Milwaukee and State of Wisconsin, have invented certain new and useful Improvements in Grain-Harvesters, of which the following is a full, clear, and exact description, reference being had to the accompanying drawings, forming a part of this specification.

My invention relates to a novel construction of a harvester tilting lever and its connection with the frame-work of the harvester.

This invention is in the same line with and similar in part to an application filed by me February 27, 1889, and now pending in the United States Patent Office, Serial No. 301,326.

Heretofore harvester tilting levers have been principally constructed of wood, the long rearward-extending arm terminating in a handle whose axis is a continuation of the axis of said arm. This form of handle necessitated the changing of the hand from one position to another while moving the lever from one extreme to the other of its sweep, which is inconvenient. My invention is designed to remedy these objections and to further improve upon the old construction by introducing a simple and effective locking mechanism for holding the lever in engagement with its sector, and other improvements hereinafter set forth.

In the drawings, Figure 1 is a perspective view of a portion of a harvester embodying my invention, the unnecessary parts being omitted or broken away. Fig. 2 is a plan view of the lever and its sector. Fig. 3 is a side elevation of the lever and its sector, the lever, with the exception of the connecting-rod which connects the operating-handle with the locking-plunger, being shown in section. Fig. 4 is an enlarged front elevation, a part of the forward-projecting arm shown in section. (See line $x\ y$, Fig. 3.)

In the drawings, G represents the master-wheel located between the outside and inside trusses of the wheel-frame in the usual way.

I is the projection of the inside truss, which forms a support for the upright $b$.

$b'$ and $b'$ are clasps which serve to connect the upright $b$ with the projection I, and they are so shaped at their lower extremities as to form an attachment for the pole F.

H represents the front elevator frame-work of the harvester.

B is the tilting-lever sector. It is bolted fast to the upper end of the upright $b$ and to the frame-work H, as shown in Fig. 1. Sector B has formed upon it near its union with the harvester-frame a lug $e'$, extending to the rear and downward in an oblique direction. Into this lug is screwed the brace-rod $e$, the lower end of which is bolted fast to the seat-piece E.

A is the pivotal or fulcrumed part of the lever. It is preferably cast in one piece, and is made hollow in form. Its forward-projecting arm is provided at its extremity with an eye, into which is hooked the connecting-rod $f$, which in turn is secured to the pole F by the pivot-bolt $f'$ at a suitable distance from the pole-clasps $b'$ and $b'$. The forward-projecting arm of piece A is also provided with a vertical elongated opening for the passage of the sector B as piece A turns upon its pivot-bolt $A^2$, which secures piece A to the sector B. The rearward-projecting arm of piece A is formed into a socket-clasp, which receives the forward end of piece C, and by means of a slot formed on the lower side of piece A and the bolt $a^3$ piece C is secured to piece A. The piece C terminates with the handle D. The operating-handle D is secured to the rear end of rod $c$, the forward end of which is formed into a locking-plunger $a$, which serves to engage with the notches formed upon the sector B, and thus lock the lever in a desired position. The rod $c$ also constitutes a pivot for the operating-handle D and the locking-plunger $a$.

In the drawings, the rod $c$ is located within the pieces A and C; but I do not wish to restrict myself to any particular location of this connecting-rod.

The operating-handle D in my invention is made to serve a double purpose: first, the disengaging of the lever from its sector B, and, second, the moving of the lever into the desired position. In its construction I place the transverse axis of the handle at a right angle to the axis of the arm C and at a right angle, or nearly so, to the plane of movement of the lever as it moves about its pivot $a^2$.

$d$ is a coil-spring encircling the connecting-rod $c$, and serves to hold the locking-plunger in its engagement with the sector B. Spring $d$ is shown in the drawings, Fig. 3, with one end attached to the operating-handle D and the other to piece C. It will be understood that I do not limit myself to this particular style of spring or its location, as there are many equivalents that will serve to produce the same result.

The operation of my device is as follows: If the handle D is turned upon its pivot in the direction of arrow Z, the locking-plunger $a$ is withdrawn from its engagement with sector B, and the lever is free to be moved up or down by turning upon its pivot $a^2$. If the handle D is carried upward, the forward arm of the lever will move correspondingly downward and, through the connecting-rod $f$, operate to raise the sill J, to which the cutter-bar is attached. Therefore the cutting apparatus will be at a greater distance from the ground. If the handle D be moved downward, an opposite result will be produced. The result produced by the moving of the lever-handle either up or down is common to all harvesters.

Having now fully described my invention, what I claim as new, and desire to secure by Letters Patent, is—

1. The combination, in a grain-harvester, of a tilting lever of tubular form having a rearward-projecting arm terminating with an operating-handle, the transverse axis of which is placed at about a right angle with the plane of movement of the lever, the locking-plunger, and the operating-handle connecting-rod formed into a single piece, the connecting-rod constituting a pivot for the operating-handle and the locking-plunger, a spring for holding the locking-plunger in engagement with the notches upon the lever-sector, and a sector secured to the harvester-frame upon which the lever is pivoted, substantially as set forth.

2. The combination, in a grain-harvester, of a tilting lever of tubular form having a rearward-projecting arm terminating in an operating-handle connected with the locking-plunger by means of a connecting-rod, the connecting-rod constituting a pivot for the operating-handle and the locking-plunger and located within and inclosed by the rearward-projecting arm of the lever, a coiled spring encircling the connecting-rod operating to hold the locking-plunger in its engagement with the lever-sector, and the sector secured to the harvester-frame, substantially as set forth.

3. In a harvester tilting lever having a pivot-piece A, cast in one piece and having lugs upon its lower side for connecting it with its sector, its rearward projection constituting a clasp in connection with pipe C, terminating in a pivoted handle, the locking-plunger $a$ and its handle connecting-rod $c$, in combination with the lever-sector secured to the harvester-frame, the oblique brace $e$, and the harvester-seat plank E, substantially as set forth.

4. In a harvester tilting lever having a pivot-piece A, cast in one piece and having lugs upon its lower side for connecting it with its sector, its forward projection provided with an eye for connecting the lever to the harvester-pole by means of the rod $f$, the elongated slot for the reception and passage of its sector, the rearward-projecting arm of the lever terminating with an operating-handle, the operating-handle connected with the locking-plunger by rod $c$, which also serves as their pivot for locking or unlocking the lever with the notches formed upon its sector, and the lever-sector secured to the upright $b$, in combination with the harvester-frame and the harvester-pole, substantially as set forth.

5. In a harvester, the combination, with the frame and pole having a hinged connection therewith, of a tilting lever fulcrumed to the frame and connected with the pole, a locking device by which the lever is secured in the desired position, and a handle connected with the locking device by a rod capable of turning axially, said handle serving to operate both the lever and the locking device, substantially as and for the purpose set forth.

In testimony whereof I have hereunto subscribed my name.

JAMES A. GRAHAM.

Witnesses:
G. H. SCHULTE,
W. J. CRANDALL.